June 16, 1959 W. R. LUSTIG 2,890,476
HINGED LID AND HOOD SUPPORTS FOR MOTOR VEHICLES
Filed Nov. 23, 1954 2 Sheets-Sheet 1
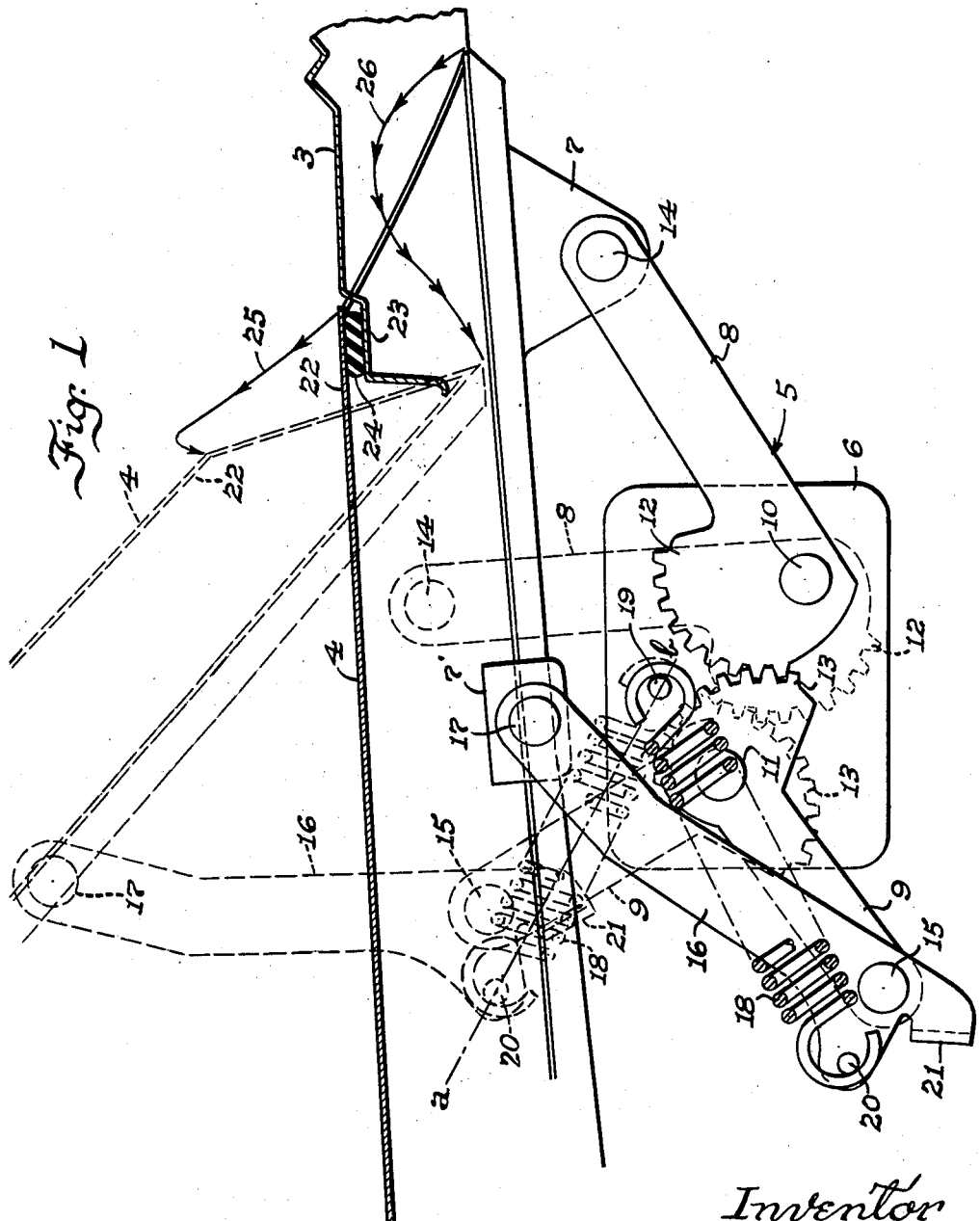
Inventor
Walter R. Lustig, Deceased
by Elvera Lustig, Administratrix

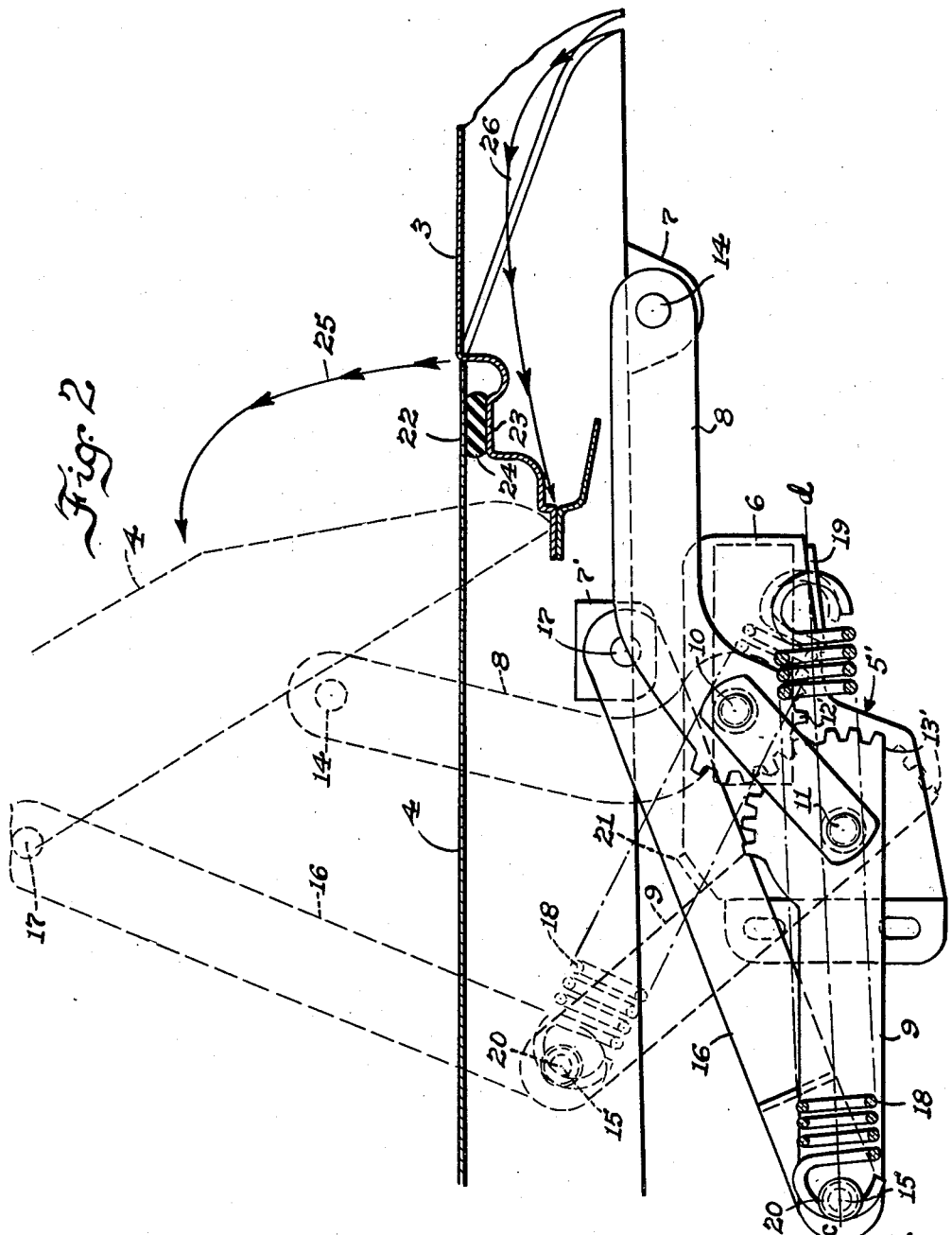

United States Patent Office 2,890,476
Patented June 16, 1959

2,890,476

HINGED LID AND HOOD SUPPORTS FOR MOTOR VEHICLES

Walter R. Lustig, deceased, late of Rockford, Ill., by Elvera Lustig, administratrix, Rockford, Ill., assignor to Atwood Vacuum Machine Company, Rockford, Ill., a corporation of Illinois Application November 23, 1954, Serial No. 470,712

14 Claims. (Cl. 16—128.1)

This invention relates to improvements in hinge connections generally, and more particularly of the type in which the butt members are connected together by arms that are geared together for joint operation, the present devices having been designed more particularly for use either with the raisable and lowerable hood provided over the engine on the front of some of the later models of motor vehicles, or with the similarly operable lid provided on the rear trunk compartment of most motor vehicles, the invention being however, also applicable to any other hingedly supported member adapted to be operated in a similar way.

The hinge support of the present invention comprises two arms that are pivotally supported at one end in spaced relation on one of two butts and have gear segments on these ends in meshed relation, causing the arms to swing in opposite directions when the hinge is operated in either an opening or closing direction, as when a lid or hood to which the other butt may be attached is raised or lowered, one of the arms being pivotally connected to said other butt directly at one point thereon and the other having a link connection therewith at another point thereon, this construction being of special advantage for lids and hoods, for example, because of the way in which the hinged edge of such closure is first raised off its seat and sealing strip in the initial opening movement and lowered again onto said seat and sealing strip at the end of the closing movement, thereby enabling hinging of such closures where they are specially curved to conform to the curved contour of the vehicle body and where ordinary pintle hinges could not be used.

A special feature of the present hinges is the provision of special gearing in order to get better lifting and holding conditions and improve the movement of the hinge arms relative to one another for better clearance with respect to the automobile body of the lids or hoods to which the hinges are applied.

The invention is illustrated in the accompanying drawings, in which—

Fig. 1 is a vertical section through the front portion of an automobile showing the lid support of the invention applied to the hood, the parts being shown in full lines in closed position and in dotted lines in open position, and Fig. 2 is a similar view showing similar results obtained using regular spur gears of a predetermined ratio, instead of the elliptical gears shown in Fig. 1.

Similar reference numerals are applied to corresponding parts in these two views.

Referring first to Fig. 1, the reference numeral 3 designates the body of an automobile and 4 the hood on the front and, while 5 designates generally one of the two geared hinges made in accordance with my invention provided under the rear end of the hood connecting the hood 4 to the body 3 for opening and closing movement. The two hinges 5 are of substantially identical construction, one being "right hand" and the other "left hand." That shown is the right hand hinge. It comprises butts or plates 6, 7 and 7', of which butt 6 is fastened to the body 3 and butts 7 and 7' to the hood 4 in any suitable or preferred manner. Two arms 8 and 9 are pivoted to the butt 6 at 10 and 11, respectively, and these arms have gear segments 12 and 13 provided on their pivoted ends which are disposed in meshing engagement so that the arms are compelled to turn simultaneously in opposite directions on their pivots when the hood 4 is raised or lowered, as will soon appear. The one arm 8 is pivotally connected at its outer end to butt 7, as shown at 14, but the other arm 9 is pivotally connected by means of a pin 15 to one end of a link 16, the other end of which has pivotal connection at 17 with butt 7'. A coiled tension spring 18 is stretched between a fixed support 19 provided on butt 6 and a movable support 20 provided at the outer end of arm 9 on the adjacent end of link 16, and this spring serves to more or less counterbalance the hood against dropping by gravity, and serves also to assist in the lifting of the hood as well as in holding it closed. A limit stop 21 that is provided on the same end of link 16 with the spring support 20 is arranged to engage the arm 9 in the open position of the hood to limit the opening movement, and in that position the pivot 15 is slightly above the deadcenter line $ab$ through spring supports 19 and 20 so that the hood is held open under a predetermined spring pressure. In the lowering of the hood the pivot 15 remains above the deadcenter line $ab$ until the hood is about half of the way down, so that it is actually held open under spring pressure and there is no danger of the hood dropping by gravity or of its closing under ordinary wind pressure against the back thereof. Of course, when the pivot 15 gets below the deadcenter line $ab$ the spring 18 gives an assist action toward the closing of the hood, which is highly desirable in holding the hood closed as well as in assisting in the latching tightly closed of the front end of the hood.

In operation, when the hood 4 is closed, as shown in full lines in Fig. 1, the rear end or hinged edge portion 22 thereof overlies a ledge 23 provided on the body and compresses a rubber sealing strip 24 secured to the ledge, whereby to seal the joint for protection of the engine compartment. When the hood is raised, the elliptical form of the gears 12—13 is responsible for a change in gear ratios from a stepdown ratio at the start of the lift to the reverse of that at the end of the lift, whereby the gear 12 turns faster at the start in relation to gear 13, so that the rear end of the hood is raised most rapidly at the outset clear of the ledge 23, its middle rear portion defining a path indicated by the curved line 25 while each of the side portions defines a path indicated by the curved line 26, insuring ample clearance for the hood with respect to the body 3 and the sealing strip 24 thereon. Of course, in the closing of the hood the rear edge follows the same paths 25—26. There is no danger of damage to the hinges or hood if the operator is careless or reckless in the operation of the hood, because when the hood reaches the open position indicated in dotted lines the stops 21 provided on the links 16 of the two hinges strike the arms 9, thereby preventing further opening movement and also eliminating any likelihood of the gears 12 and 13 becoming unmeshed.

The geared hinge 5' disclosed in Fig. 2 has spur gears 12' and 13', which have approximately a 1 to 2 ratio, and in that way the arm 8 is swung enough faster in relation to arm 9 to insure raising the rear end 22 of the hood fast enough in relation to the other end to provide the desired clearance, as shown by curved lines 25 and 26. This construction is otherwise closely similar to that of Fig. 1 and the other parts have been numbered alike. Spring 18 in this form exerts very little force when the hood is closed, even though it is then fully stretched. See line $cd$, which indicates that the arm 9 is then nearly on deadcenter. The spring comes into play more and more, the farther the hood is raised. At the limit of such movement the arm 9 engages a stop 21 on plate 6.

It is believed the foregoing description conveys a good understanding of the objects and advantages of the invention. The appended claims have been drawn to cover all legitimate modifications and adaptations.

What is claimed is:

1. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions, said spur gears being of segmental elliptical form with the longest radius of one aligned with the smallest radius of the other, whereby said arms move in a predetermined rotary speed relationship to one another, there being a predetermined difference in the amount of travel of the free end of one arm relative to the amount of travel of the free end of the other arm, due to the difference in radial dimensions of said gears, one of said arms being pivotally connected at its free end to the second member at one point, and a link pivotally connected at one end to the free end of the other arm and having its other end pivotally connected to the second member at another point in spaced relation to the other pivotal connection thereon.

2. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions, said spur gears being of segmental elliptical form with the longest radius of one aligned with the smallest radius of the other, whereby said arms move in a predetermined rotary speed relationship to one another, there being a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, and a stop arranged to limit the movement when the members have been moved a predetermined distance.

3. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions, said spur gears being of segmental elliptical form with the longest radius of one aligned with the smallest radius of the other, whereby said arms move in a predetermined rotary speed relationship to one another, there being a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, a stop arranged to limit the movement when the members have been moved a predetermined distance, and a tension spring connected at one end to the first of said members and at its other end to the outer end portion of one of said arms so that the spring is stretched when the members are moved toward each other.

4. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions, said spur gears being of segmental elliptical form with the longest radius of one aligned with the smallest radius of the other, whereby said arms move in a predetermined rotary speed relationship to one another, there being a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, and a tension spring connected at one end to the outer end portion of one of said arms so that the spring is stretched when the members are moved toward each other.

5. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions but with a predetermined difference in the amount of travel of the free end of one arm relative to the amount of travel of the free end of the other arm, due to the difference in radial dimensions of said gears, one of said arms being pivotally connected at its free end to the second member at one point, and a link pivotally connected at one end to the free end of the other arm and having its other end pivotally connected to the second member at another point in spaced relation to the other pivotal connection thereon.

6. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions but with a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, and a stop arranged to limit the movement when the members have been moved a predetermined distance.

7. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions but with a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, a stop arranged to limit the movement when the members have been moved a predetermined distance, and a tension spring connected at one end to the first of said members and at its other end to the outer end portion of one of said arms so that the spring is stretched when the members are moved toward each other.

8. Means for pivotally connecting two members comprising two arms pivoted adjacent one end on the first of said members at two points in spaced relation and having their pivoted ends operatively connected by a segmental spur gear rigid with one of said arms meshing with a segmental spur gear of different radial dimensions rigid with the other of said arms so as to turn simultaneously in opposite directions but with a predetermined difference in the amount of travel of the free end of one arm relative to the amount of travel of the free end of the other arm, due to the difference in radial dimensions of said gears, one of said arms being pivotally connected at its free end to the second member at one point, a link pivotally connected at one end to the free end of the other arm and having its other end pivotally connected to the second member at another point in spaced relation to the other pivotal connection thereon, and a tension spring connected at one end to the first of said members and at its other end to the outer end portion of one of said arms so that the spring is stretched when the members are moved toward each other.

9. Means for pivotally connecting two arms comprising two arms pivoted adjacent one end on the first of said members at two points in spaced relation and having gear connections at their pivoted end consisting of a segmental gear on the pivoted end of one of said arms and another segmental gear meshing therewith on the pivoted end of the other of said arms, the last mentioned gear having an appreciably larger radius than the first mentioned gear for a step-down drive ratio between said gears, whereby the arms turn simultaneously in opposite directions at appreciably different speeds, the arm carrying the smaller gear being pivotally connected at its free end to the second member at one point, and a link pivotally connected at one end to the free end of the other arm and having its other end pivotally connected to the second member at another point in spaced relation to the other pivotal connection thereon.

10. Means for pivotally connecting two members comprising two arms pivoted adjacent one end on the first of said members at two points in spaced relation and having gear connections at their pivoted end consisting of a segmental gear on the pivoted end of one of said arms and another segmental gear meshing therewith on the pivoted end of the other of said arms, the last mentioned gear having an appreciably larger radius than the first mentioned gear for a step-down drive ratio between said gears, whereby the arms turn simultaneously in opposite directions at appreciably different speeds, the arm carrying the smaller gear being pivotally connected at its free end to the second member at one point, a link pivotally connected at one end to the free end of the other arm and having its other end pivotally connected to the second member at another point in spaced relation to the other pivotal connection thereon, and a stop arranged to limit the movement when the members have been moved a predetermined distance, whereby to prevent unmeshing of the gears.

11. Means for pivotally connecting two members comprising two arms pivoted adjacent one end on the first of said members at two points in spaced relation and having gear connections at their pivoted end consisting of a segmental gear on the pivoted end of one of said arms and another segmental gear meshing therewith on the piovted end of the other of said arms, the last mentioned gear having an appreciably larger radius than the first mentioned gear for a step-down drive ratio between said gears, whereby the arms turn simultaneously in opposite directions at appreciably different speeds, the arm carrying the smaller gear being pivotally connected at its free end to the second member at one point, a link pivotally connected at one end to the free end of the other arm and having its other end pivotally connected to the second member at another point in spaced relation to the other pivotal connection thereon, a stop arranged to limit the movement when the members have been moved a predetermined distance, and a tension spring connected at one end to the first of said members and at its other end to the outer end portion of one of said arms so that the spring is stretched when the members are moved toward each other.

12. Means for pivotally connecting two members comprising two arms pivoted adjacent one end on the first of said members at two points in spaced relation and having gear connections at their pivoted end consisting of a segmental gear on the pivoted end of one of said arms and another segmental gear meshing therewith on the pivoted ends of the other of said arms, the last mentioned gear having an appreciably larger radius than the first mentioned gear for a step-down drive ratio between said gears, whereby the arms turn simultaneously in opposite directions at appreciably different speeds, the arm carrying the smaller gear being pivotally connected at its free end to the second member at one point, a link pivotally connected at one end to the free end of the other arm and having its other end pivotally connected to the second member at another point in spaced relation to the other pivotal connection thereon, and a tension spring connected at one end to the first of said members and at its other end to the outer end portion of one of said arms so that the spring is stretched when the members are moved toward each other.

13. A structure as set forth in claim 4 wherein the tension spring in the movement of said arms form one extreme position to the other passes from one side to the other with respect to one of said pivots and accordingly reverses the spring bias.

14. A structure as set forth in claim 8 wherein the tension spring in the movement of said arms from one extreme position to the other passes from one side to the other with respect to one of said pivots and accordingly reverses the spring bias.

References Cited in the file of this patent

UNITED STATES PATENTS

| | | |
|---|---|---|
| 2,668,320 | Lustig | Feb. 9, 1954 |
| 2,683,280 | Martens | July 13, 1954 |